July 27, 1965  E. R. DUFF  3,197,267
PICKLING RACK
Filed Nov. 18, 1963  3 Sheets-Sheet 1
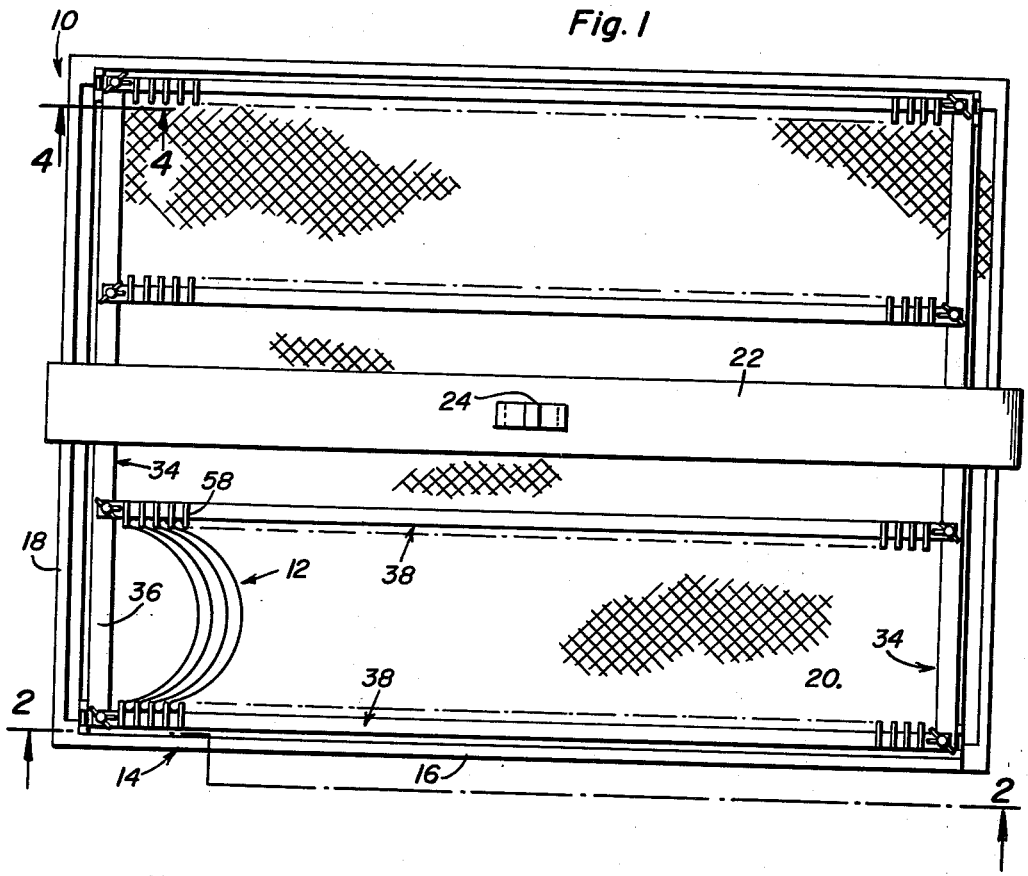
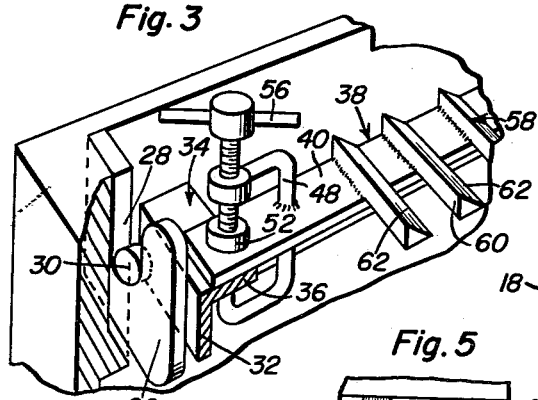
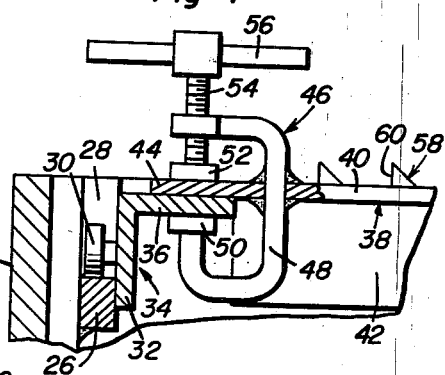
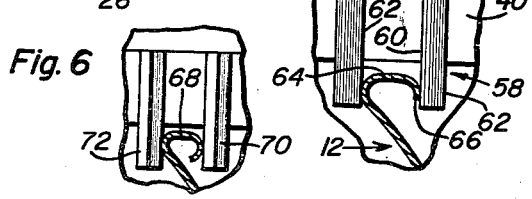
Earl R. Duff
INVENTOR.

July 27, 1965  E. R. DUFF  3,197,267
PICKLING RACK
Filed Nov. 18, 1963  3 Sheets-Sheet 2
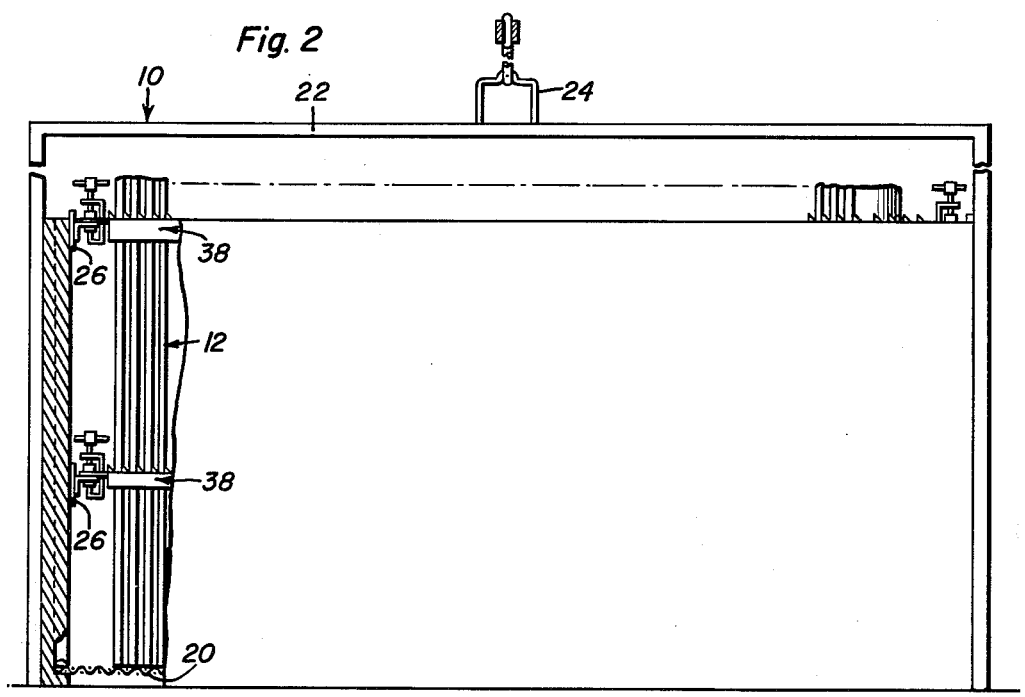
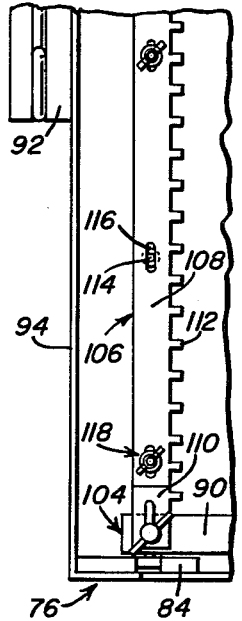
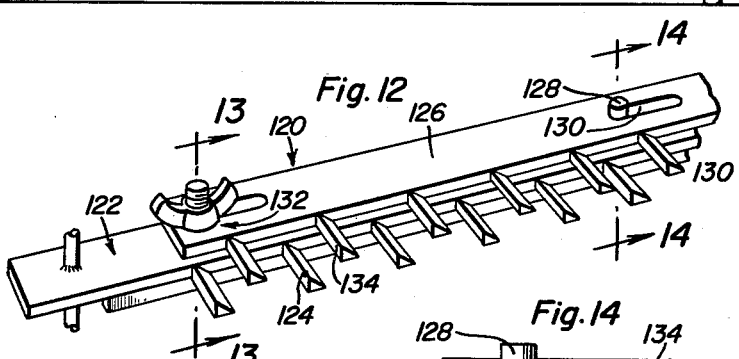
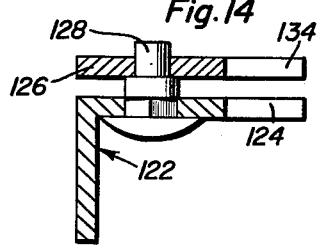
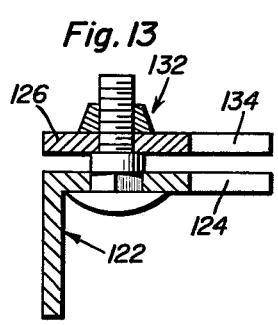
Earl R. Duff
INVENTOR.

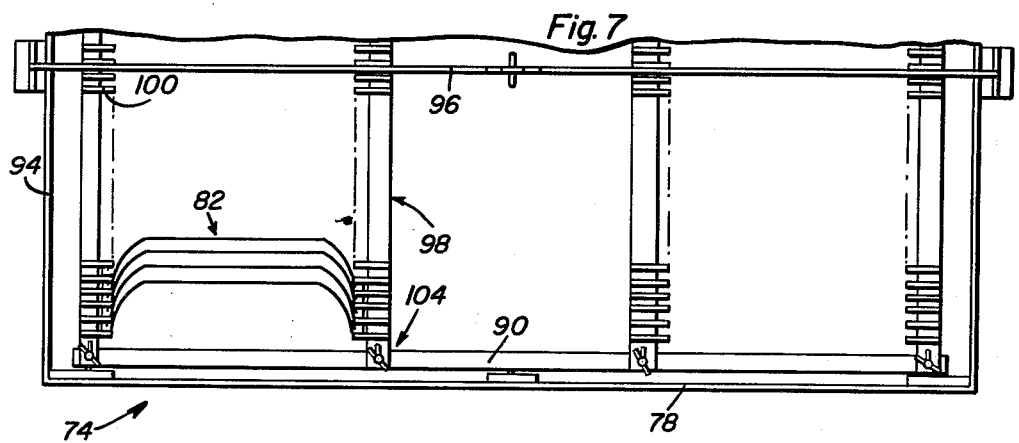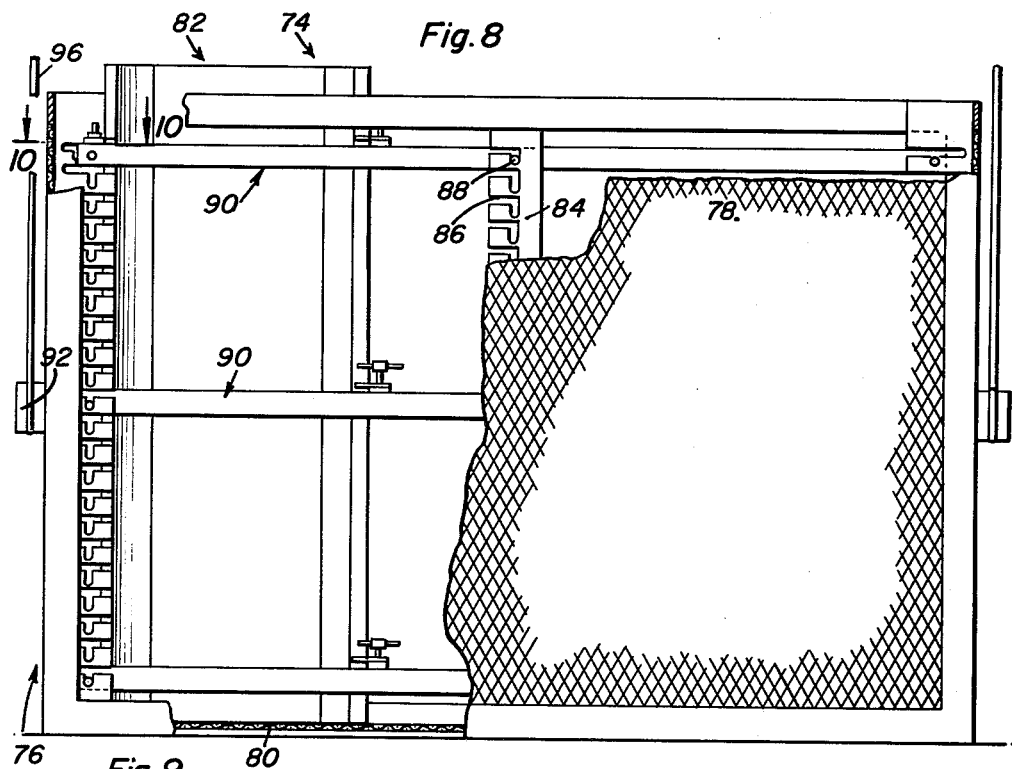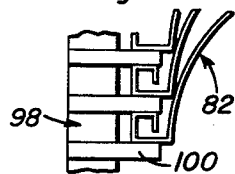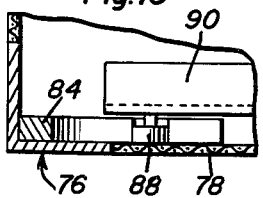
Earl R. Duff
INVENTOR.

United States Patent Office 3,197,267
Patented July 27, 1965

3,197,267
PICKLING RACK
Earl R. Duff, 613 E. Canal St., Newcomerstown, Ohio
Filed Nov. 18, 1963, Ser. No. 324,405
9 Claims. (Cl. 312—213)

This invention relates to an article holding rack for manufactured articles which are to be processed by immersion in a liquid mixture or a solution of chemicals.

The article holding rack of the present invention is particularly suited for elongated metallic parts such as fluorescent lamp reflectors which are processed by immersion thereon in an acid solution, for removal of rust, and in other solutions. It is therefore a primary object of the present invention to provide a rack for holding such parts in proper spaced relation to each other so that they may be immersed in one or more tanks containing liquids. The rack of the present invention is therefore useful in connection with the bathing of manufactured articles in liquids and draining thereof for various purposes including the cleansing of the surfaces of the articles, removal of deposits therefrom and/or coating of such articles.

An additional object of the present invention in accordance with the foregoing objects, is to provide a rack cage within which a relatively large number of manufactured parts may be loaded in nested but spaced relationship to each other for exposure of all surfaces thereof to a liquid bath into which the rack is inserted and withdrawn.

A still further object of the present invention in accordance with the foregoing object, is to provide a rack that is adjustable so as to receive manufactured parts of different dimensions and shapes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of one form of rack cage constructed in accordance with the present invention.

FIGURE 2 is a side elevational view with a portion in section of the rack cage illustrated in FIGURE 1.

FIGURE 3 is an enlarged partial perspective view of a corner portion of the rack cage illustrated in FIGURES 1 and 2.

FIGURE 4 is a partial sectional view taken substantially through a plane indicated by the section line 4—4 in FIGURE 1.

FIGURE 5 is an enlarged top plan sectional view of a portion of the rack cage showing a pair of spacing projections holding a portion of a fluorescent lamp reflector therebetween.

FIGURE 6 is a partial top plan sectional view similar to FIGURE 5 illustrating another form of spacing projection for use in connection with a different type of reflector part.

FIGURE 7 is a partial top plan view of another form of rack cage made in accordance with the present invention.

FIGURE 8 is a side elevational view of the rack cage illustrated in FIGURE 7 with parts broken away.

FIGURE 9 is an enlarged partial top plan view of a portion of the rack structure illustrated in FIGURE 7.

FIGURE 10 is a partial sectional view taken substantially through a plane indicated by the section line 10—10 in FIGURE 8.

FIGURE 11 is an enlarged partial top plan view illustrating a further modification of the rack structure.

FIGURE 12 is a partial perspective view of a still further modified form of rack structure.

FIGURE 13 is a sectional view taken substantially through a plane indicated by the section line 13—13 in FIGURE 12.

FIGURE 14 is a sectional view taken substantially through a plane indicated by the section line 14—14 in FIGURE 12.

Referring now to the drawings in detail, it will be observed from FIGURES 1 and 2, that a rack cage structure generally referred to by reference numeral 10 is shown adapted to be loaded with a plurality of elongated fluorescent lamp reflectors 12 which are loaded into the rack cage in vertically nested but spaced relationship to each other. The cage is formed by a housing generally referred to by reference numeral 14 having a plurality of vertical sides which in the illustrated embodiment, form a rectangle between the parallel spaced longer sides 16 and the parallel spaced ends 18. The top side of the housing is opened so that the reflectors 12 may be inserted into abutting relation to a foraminous bottom closure 20 made of a screen-like material. The sides and ends of the housing are also made of a suitable material such as acid-resistant steel so as to withstand the corrosive effects of the chemical solutions into which the cage rack is immersed. The cage rack is suspended by any overhead conveyor mechanism and lowered into a chemical solution tank by means of a bail 22 connected to the ends 18 to which a suspension hook 24 is connected.

Mounted within the housing 14 adjacent each corner, are at least two bracket plate members 26 vertically spaced above the foraminous bottom closure 20 as more clearly seen in FIGURE 2. Each bracket plate member may be welded in place and is provided with a vertical slot 28 adapted to receive a pin or hook 30 which projects from the vertical leg portion 32 of an angle shaped supporting bar 34 as more clearly seen in FIGURE 3. The pins 30 therefore project from the supporting bar 34 adjacent the opposite end portions thereof for reception within the bracket members 26 located adjacent the corners of the housing. Support bars 34 will therefore extend in close parallel spaced relation to the ends 18 at two vertically spaced levels within the housing. Each of the support bars is also provided with a horizontal leg portion 36 which may have scale indicia mounted or inscribed thereon so as to adjustably position a plurality of positioning bars 38 between the supporting bars at the opposite ends of the housing at each vertical level.

The positioning bars 38 are disposed in parallel pairs between the sides 16 of the housing so as to hold and space between each pair, the articles or reflectors 12 as more clearly shown in FIGURE 1. Accordingly, positioning bars are disposed in close spaced adjacency to the sides 16 and on opposite sides of the bail 22. As more clearly seen in FIGURES 3 and 4, each positioning bar 38 includes a horizontal leg portion 40 and a vertical leg portion 42 which is cut away at the end portions 44 of the positioning bar so that the horizontal portion 40 of the positioning bar may rest on the horizontal portions 36 of the supporting bars 34 and be clamped thereto in an adjusted position by means of clamp devices 46 secured to the opposite end portions of the positioning bars 38. Each clamp device 46 includes a C-shaped member 48 welded to the positioning bar to which a fixed jaw 50 is secured. The fixed jaw 50 therefore abuts the horizontal portion 36 of the supporting bar 34 so as to clamp the end portion 44 thereto when the movable jaw 52 is brought into pressure engagement therewith by rotation of the screw shaft 54 threadedly mounted by the member 48 and to which the clamping handle 56 is connected. It will therefore be apparent, that the positioning bars 38 may be clamped in adjusted position measured by the scale indicia on the supporting bars 34 so as to accommodate articles or reflectors 12 of different dimensions.

Each pair of positioning bars 38 has a plurality of spaced projections 58 welded thereon, said projections extending from the horizontal leg portions 40 of each pair of positioning bars toward each other so as to space and hold the reflectors 12 between each pair of positioning bars. The spacing projections 58 will therefore be spaced apart by the proper distance depending upon the cross-sectional shape and dimension of the reflectors being held in the rack cage. It will also be noted from FIGURES 3, 4 and 5, that the spacing projections are triangular in shape including a flat vertical face 60 and an opposite edge 62. The spacing projections 58 are therefore designed to engage reflector parts 12 having bead portions 64 terminating in a sharp edge 66. The sharp edge 66 is therefore engaged by the flat vertical face 60 while the curved portion of the bead 64 engages the edge 62 of a spacing projection as illustrated in FIGURE 5. Where a reflector part is utilized having a different type of bead portion 68 as illustrated in FIGURE 6, without any sharp contacting edges, spacing projections 70 may be utilized having symmetrical edges 72 for engagement of the bead portions 68 on opposite sides thereof.

Referring now to FIGURES 7 and 8, another form of rack cage 74 is illustrated being formed within a cage housing constructed from a frame 76 supporting vertical sides 78 made of foraminous material in addition to the foraminous bottom closure 80 spaced from the open top through which another type of incandescent lamp reflector 82 may be loaded. Welded to the frame along the opposite sides 78, both at the corners and intermediate the corners, are vertical bracket bars 84. Each bracket bar is provided with a plurality of vertically spaced L-slots 86 adapted to receive and seat pins 88 projecting from the vertical leg portions of vertically spaced supporting bars 90. Housing frame 76 is also provided with pivots 92 on the opposite sides 94 interconnected by the bail 96 so as to pivotally suspend the rack cage.

Adjustably positioned between the supporting bars 90 on the opposite sides 78, are pairs of positioning bars 98 from which spacing projections 100 extend for holding the reflector parts 82 in spaced nested relationship to each other. Each positioning bar 98 is therefore provided at opposite end portions thereof with clamp devices 104 similar in construction and use to the clamp devices 46 described with respect to the first embodiment. It will therefore be apparent, that the rack cage 74 is similar in construction and use to the rack cage 10 except for the construction and mounting of the bracket means whereby supporting bars may be removably mounted in adjustably spaced relationship to each other.

Referring now to FIGURE 11 in particular, it will be observed that the positioning bar may be replaced by a modified form of spacing bar assembly 106 which includes a member 108 slidably mounted on a bottom bar member 110, both members being provided with integral spacing projections 112. The bar members 108 and 110 are slidably connected to each other by means of the pins 114 on the lower bar member 110 projecting through slots 116 on the upper bar member 108. The bar members may be locked in adjusted position with respect to each other by means of a plurality of locknut devices 118. Accordingly, the spacing bar assemblies 106 may be adjusted in length and the spacing between the spacing projections 112 changed. Referring therefore to FIGURES 12–14, an adjustable spacing bar assembly 120 is illustrated suitable for the rack cage described in connection with the first embodiment as a replacement for the positioning bars 38. It will therefore be observed that the bar assembly 120 includes an angle member 122 from which the spacing projections 124 extend, the angle member 122 slidably mounting the top bar member 126. Upwardly projecting pins 128 on the angle bar member 122 therefore extend through slots 130 formed in the top bar member 126. Also, locknut devices 132 are provided so as to lock the bar members in adjusted position relative to each other. The top bar member is therefore also provided with spacing projections 134.

From the foregoing description, the construction and use of the rack cages described, will be apparent. It will therefore be appreciated, that a relatively large number of manufactured articles adapted to be nested together, may be loaded into the rack cage in closely spaced relationship so as to accommodate a relatively large number of such articles. The articles so held in spaced relationship, may then be lowered into the processing liquid with a minimum of fluid turbulence and with all surfaces of the parts or articles being exposed to the liquid. The rack cage may also be withdrawn from the liquid bath and permitted to completely drain. Because of the novel constructional features described, adjustments may be made in the rack structure so as to accommodate articles of different shapes and sizes. A considerable savings in labor and time may therefore be effected at a minimum cost for equipment, parts of which may be replaced or adjusted so as to render the rack structure extremely versatile.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A rack for holding a plurality of articles capable of being stacked in nested relationship to each other comprising, a housing having an open side through which said articles are inserted and at least one side spaced from said open side, said one side being closed by a foraminous closure to retain the articles in the housing, positioning means mounted in the housing for holding said articles closely spaced in said nested relationship abutting the foraminous closure, said positioning means comprising at least two pair of supporting bars, bracket means removably mounting said supporting bars in spaced relation to the foraminous closure, at least one pair of parallel spacing bars mounted in adjusted spaced relation between each of said pairs of supporting bars, and a plurality of spacing projections extending from the respective spacing bars of each of said pairs toward each other for engagement by the articles disposed between said pairs of spacing bars, said spacing projections including flat faces engaged by edge portions of said articles and sharp edges engaged by surface portions of said articles, and clamp means secured to opposite end portions of each spacing bar for securing the spacing bar in adjusted position between the supporting bars, said bracket means comprising a plurality of plate members secured to the housing and having slots therein for receiving pins projecting from the supporting bars.

2. The combination of claim 1 including adjusting bars slidably mounted on each of said spacing bars having spacing projections extending therefrom and means for locking the adjusting bars in adjusted positions on the spacing bars for changing the spacing between the articles engaged by the spacing projections.

3. A rack for holding a plurality of articles capable of being stacked in nested relationship to each other comprising, a housing having an open side through which said articles are inserted and at least one side spaced from said open side, said one side being closed by a foraminous closure to retain the articles in the housing, at least two pair of supporting bars having pins projecting therefrom, bracket means having slots receiving said pins for removably mounting said supporting bars in spaced relation to the foraminous closure, at least one pair of parallel spacing bars mounted in adjusted spaced relation between each of said pairs of supporting bars, and a plurality of spacing projections extending from the respective spacing bars of each of said pairs toward each other for engagement by the articles disposed between said pairs of spacing bars.

4. A rack for holding a plurality of articles capable of being stacked in nested relationship to each other comprising, a housing having an open side through which said articles are inserted and at least one side spaced from said open side, said one side being closed by a foraminous closure to retain the articles in the housing, at least two pairs of supporting bars, bracket means removably mounting said supporting bars in spaced relation to the foraminous closure, at least one pair of parallel spacing bars mounted in adjusted spaced relation between each of said pairs of supporting bars, and a plurality of spacing projections extending from the respective spacing bars of each of said pairs toward each other for engagement by the articles disposed between said pairs of spacing bars, and means connected to said housing for suspension thereof with the articles loaded therein, said bracket means comprising a plurality of plate members secured to the housing and having slots therein for receiving pins projecting from the supporting bars.

5. The combination of claim 3 including adjusting bars slidably mounted on each of said spacing bars having spacing projections extending therefrom and means for locking the adjusting bars in adjusted positions on the spacing bars for changing the spacing between the articles engaged by the spacing projections.

6. A rack for holding a plurality of articles capable of being stacked in nested relationship to each other comprising, a frame enclosing said articles, closure means secured to the frame in abutting relation to the articles for retaining the articles in the frame, at least two pair of supporting bars having pins projecting therefrom, means secured to the frame having slots receiving said pins for removably mounting the supporting bars in spaced relation to said closure means, and positioning means mounted between said pair of supporting bars for holding said articles closely spaced in abutting relation to the closure means, said positioning means comprising, a plurality of spacing bars, each spacing bar having spaced projections engageable with said articles for spacing thereof, each projection having a flat face portion and a relatively sharp edge portion for respectively engaging edges and surfaces on said articles.

7. A rack for holding a plurality of articles capable of being stacked in nested relationship to each other comprising, a frame enclosing said articles, closure means secured to the frame in abutting relation to the articles for retaining the articles in the frame, at least two pair of supporting bars having pins projecting therefrom, means secured to the frame having slots receiving said pins for removably mounting the supporting bars in spaced relation to said closure means, and positioning means mounted between said pair of supporting bars for holding said articles closely spaced in abutting relation to the closure means, said positioning means including a pair of spacing bars having spacing projections extending therefrom for engagement with said articles, means slidably mounting said spacing bars relative to each other for adjustably spacing the projections, means clamping one of said pair of spacing bars between the supporting bars and means for locking the spacing bars in an adjusted position relative to each other to space said articles by a desired amount.

8. A rack for holding a plurality of articles capable of being stacked in nested relationship to each other comprising, a frame enclosing said articles, closure means secured to the frame in abutting relation to the articles for retaining the articles in the frame, at least two pair of supporting bars having pins projecting therefrom, means secured to the frame for removably mounting the supporting bars in spaced relation to said closure means, a pair of spacing bars having spacing projections extending therefrom for engagement with said articles, means slidably mounting said spacing bars relative to each other for adjustably spacing the projections, means clamping one of said pairs of spacing bars between the supporting bars and means for locking the spacing bars in an adjusted position relative to each other to space said articles by a desired amount.

9. The combination of claim 8 wherein each of said spacing projections includes a flat face portion and a relatively sharp edge portion for respectively engaging edges and surfaces on said articles.

References Cited by the Examiner

UNITED STATES PATENTS

| 268,148 | 11/82 | Thomas | 118—501 |
| 729,055 | 5/03 | Forger | 134—76 X |
| 952,191 | 3/10 | Glaser | 118—428 |
| 1,106,915 | 8/14 | Beasejour | 118—500 |
| 1,142,823 | 6/15 | Lockwood | 38—102.91 |
| 1,182,470 | 5/16 | Frey | 312—213 X |
| 1,365,584 | 1/21 | Constable | 38—102 |
| 1,715,070 | 5/29 | Kusterle | 5—294 |
| 1,888,155 | 11/32 | Biedinger | 211—182 |

FRANK B. SHERRY, *Primary Examiner*.

CHANCELLOR E. HARRIS, *Examiner*.